United States Patent [19]

Dolenc

[11] Patent Number: 5,031,808
[45] Date of Patent: Jul. 16, 1991

[54] VEHICLE INTERIOR RECEPTACLE

[75] Inventor: Theodore Dolenc, Torrance, Calif.

[73] Assignee: Plasticolor Molded Products, Inc., Fullerton, Calif.

[21] Appl. No.: 496,356

[22] Filed: Mar. 20, 1990

[51] Int. Cl.⁵ .............................................. B60R 7/00
[52] U.S. Cl. ............................ 224/42.46 R; 248/311.2; 248/95; 224/280; 383/17; 383/22
[58] Field of Search ........ 224/42.46 R, 280, 42.45 R, 224/42.43; 383/7, 17, 22, 23, 119, 84, 86; 296/153, 89, 93; 206/806, 567; 248/311.2 X, 95 X

[56] References Cited

U.S. PATENT DOCUMENTS

| | | | |
|---|---|---|---|
| 1,486,566 | 3/1924 | Crecelius | 224/42.46 R |
| 1,606,944 | 11/1926 | Johnson | 224/42.46 R |
| 2,778,554 | 1/1957 | Porkola | 224/42.46 R |
| 3,097,788 | 7/1963 | Nichols | 383/22 |
| 3,163,338 | 12/1964 | Gottsegen | 224/42.46 R |
| 3,229,946 | 1/1966 | MacKay | 224/42.46 R |
| 4,154,383 | 5/1979 | Honatzis | 248/95 X |
| 4,783,114 | 11/1988 | Welch | 296/153 |
| 4,805,957 | 2/1989 | Fletcher | 296/153 |

FOREIGN PATENT DOCUMENTS

| | | | |
|---|---|---|---|
| 1182600 | 6/1959 | France | 383/17 |
| 1345182 | 1/1974 | United Kingdom | 224/42.46 R |

Primary Examiner—Henry J. Recla
Assistant Examiner—Glen T. Barrett
Attorney, Agent, or Firm—Harold L. Jackson

[57] ABSTRACT

A receptacle for the collection of litter or the storage of loose items in a vehicle interior is disclosed. The receptacle comprises a container with an integrally formed flap for suspending the container from a vehicle door for convenient access by a vehicle occupant to the container interior. The flap includes a tab which engages the vehicle door window slot and which provides a wedged attachment within the door when supporting heavier loads.

12 Claims, 2 Drawing Sheets

VEHICLE INTERIOR RECEPTACLE

BACKGROUND OF THE INVENTION

The present invention is directed to containers for receiving and retaining otherwise unsecured objects within a vehicle interior. The receptacle of the present invention is particularly suited for litter collection and for storage of loose items in automobile interiors when frequent repositioning, removal or disposal of the receptacle is desirable.

The overall trend in recent years to reduce automobile size has resulted in increased popularity of devices which maximize the utilization and convenience of the vehicle interior without interference with passenger comfort and safety. Further, heightened environmental consciousness of the general public has resulted in a greater tendency of many persons to avoid discarding litter from automobiles onto the roads and highways. These and other factors have created an increasing demand for vehicle receptacles within the passenger compartment which receive unsecured objects or litter and which are unobtrusive but convenient to use, easy to install and remove and, preferably, inexpensive and disposable.

Vehicle litter bags and caddies of the prior art are widely used today to receive and retain waste and litter or to store maps, coins and personal items. Such prior art devices typically employ a plastic pouch having a circular aperture in a rear wall for receiving a door handle or instrument panel knob. Among other deficiencies, such devices are inconveniently located, interfere with the normal operation of the control knob or other fixture to which they are attached, are frequently an obstacle to the normal entrance and exit from the vehicle, and are subject to disconnection and spilled contents during use and vehicle operation.

Therefore, a need exists for an inexpensive container which does not impede the normal operation of systems in the vehicle interior and is easily removable, disposable and conveniently and securely installed proximate virtually any occupant.

SUMMARY OF THE INVENTION

The present invention is directed to a storage receptacle which, when installed within a vehicle interior, solves all of the aforementioned deficiencies of the prior art in a mutually compatible fashion. The need for a removable receptacle which can be easily and securely installed is satisfied by providing a container having a supporting flap which forms a secure wedged engagement with the vehicle door interior when subjected to the tension of supporting a load within the container. The flap releases its engagement to the door interior when the receptacle and flap are lifted from the door. The receptacle is securely installed to the vehicle interior by the insertion of a flap, integrally formed to the container, into the window retraction slot of the vehicle door. The flap includes an area of increased thickness or rigidity which forms a substantially horizontal hinge line therein.

When positioned onto the vehicle door for supporting objects placed within the partially closed interior of the container, the hinge line of the flap engages the rubber insert mounted to the door proximate the window retraction slot. The forces applied to the flap from the supported load are transmitted through the flap toward the hinge line. Beyond the hinge line the tension is transmitted substantially across the upper flap surface thereby pulling that surface beyond the hinge line. Sufficient torque is thereby created to rotate the rigid flap portion upwardly until it engages a surface within the vehicle door thereby wedging the rigid flap portion within the door and so securing the entire receptacle to the vehicle door. The attachment of the flap with the rubber insert includes a degree of frictional engagement sufficient to resist movement of the container when the vehicle window is raised or lowered.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 2:
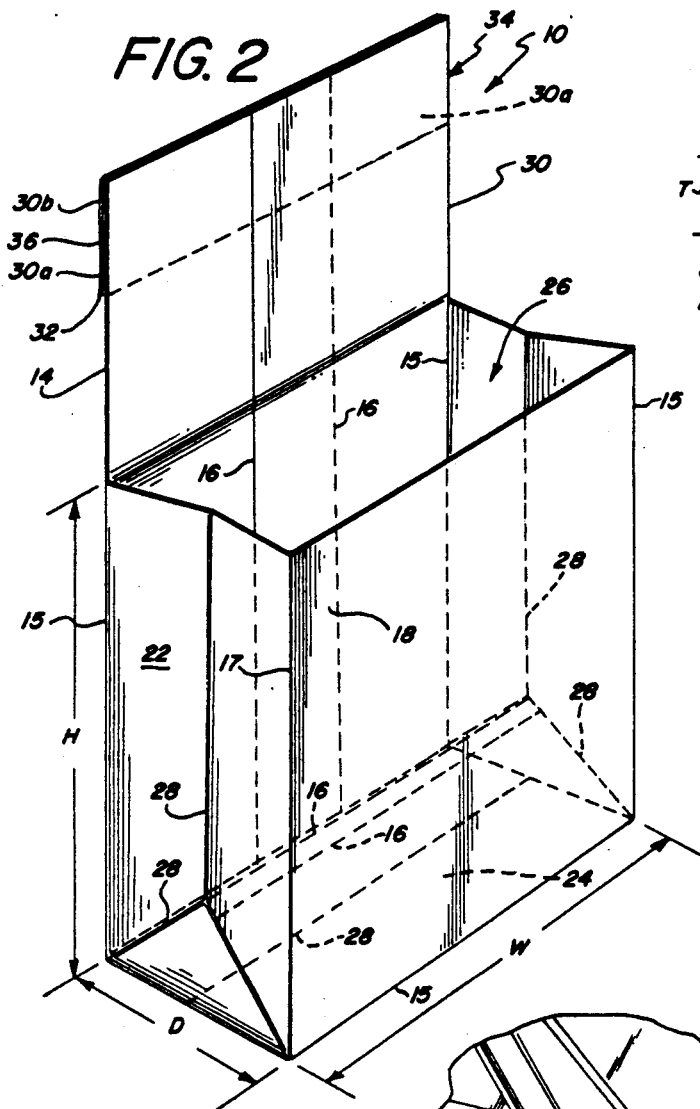
FIG. 2 is a perspective view of a preferred embodiment of the container of the present invention.
Figure 1:
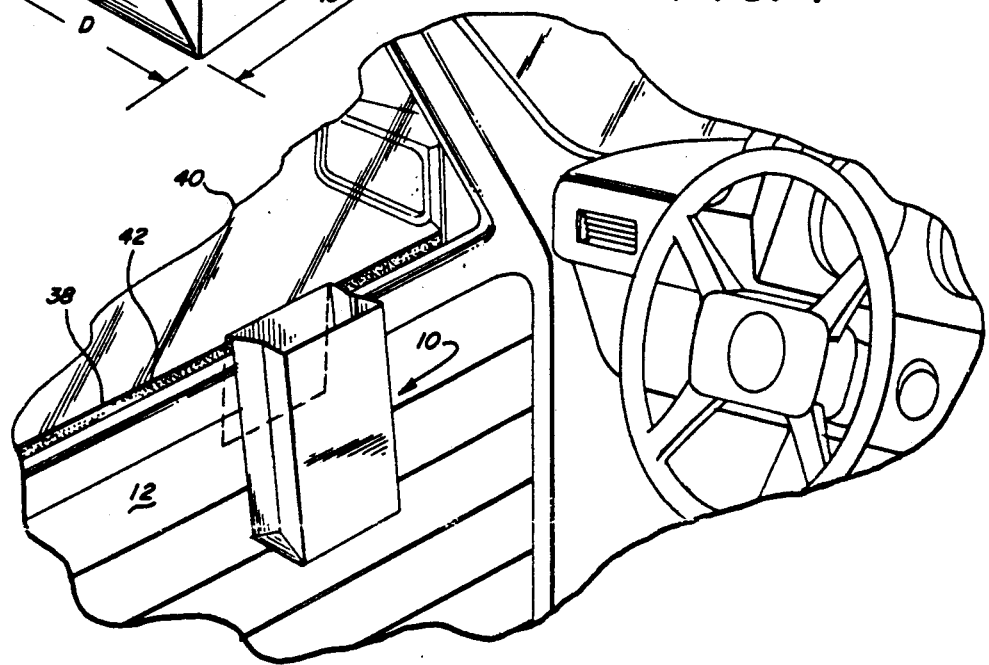
FIG. 1 is a perspective view of a preferred embodiment of the container of the present invention installed on an automobile door.

Referring to the drawings, wherein like numerals refer to the same elements, and in particular to FIGS. 1 and 2, a preferred embodiment of a container in accordance with the present invention, designated generally as 10, is shown installed onto the interior side of an automobile door 12. The container 10 preferably is constructed of a thin plastic sheet material such as 2 mil. polyethylene sheet. The container 10 may also be constructed of other suitable sheet materials, for example, a waxed paper.

Figure 3:
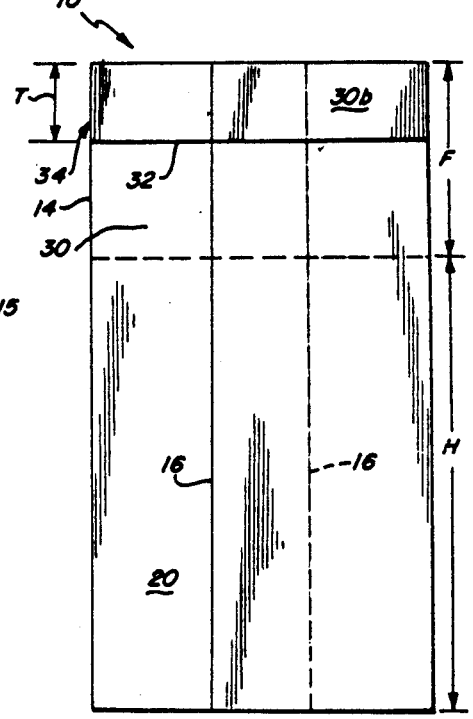
FIG. 3 is a rear elevational view of the embodiment of the present invention shown in FIG. 2.
Figure 4:
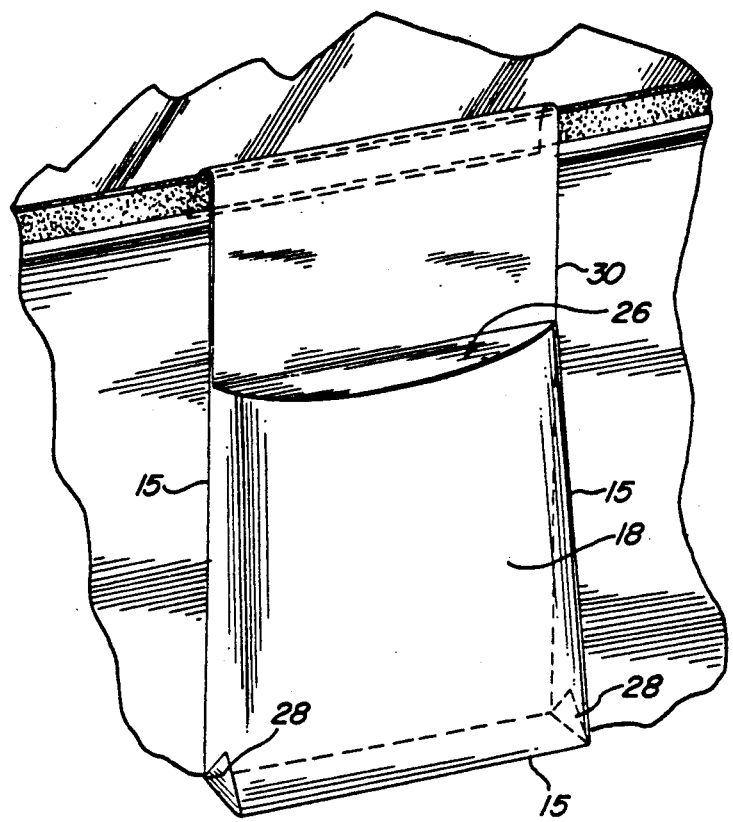
FIG. 4 is a perspective view of an alternative embodiment of the container of the present invention installed on an automobile door.

The container 10 is shown in greater detail in FIGS. 2 and 3. It preferably is fabricated from a single plastic sheet 14 having a series of folds 15 and edges 16. The edges are overlapped during assembly and then heat sealed or otherwise joined together to form a front panel 18, rear panel 20, side panels 22 and bottom panel 24, all defining a partially closed interior 26. The side and bottom panels 22, 24 are pleated to form a gusset by creasing each panel by means of heat or pressure to form folds 28. Folds 15 are similarly formed. Alternatively, a direct connection between adjacent edges of panels 18, 20 can be substituted for bottom panel 24 and/or side panels 22, as illustrated in FIG. 4.

The rear panel 20 includes an integrally formed extension which defines a flap 30. The outer edge 32 of flap 30 is folded over onto the extension of rear panel 20, as best seen in FIG. 3, to form an upper tab 34. The upper tab 34 includes a stiff section 36 sandwiched between the overlapping front and rear portions 30a, 30b, respectively, of tab 34. The section 36 is fabricated of any sufficiently rigid sheet material, for example, 10 mil chipboard. Such a section would have a substantially uniform thickness. The portions 30a, 30b are joined, as by heat sealing, so as to enclose and secure the section 36 therebetween.

In most applications involving automobiles, it has been found that a container having a width W of about 7 inches, a height H of about 8 inches and a depth D of approximately 2 inches are preferable along with a flap length F, extending from the opening of interior 26, of about 4 inches, including a tab length T of approximately one inch.

To install the container 10 to a vehicle door 12, the tab 34 is inserted into the window retraction slot 38 between the window 40 and rubber insert 42 with the surface of front portion 30a abutting the window. When fully inserted, the horizontal ridge formed by section 36 proximate the edge 32 of flap 30 engages a segment of insert 42 within the door. When so installed the container is positioned, as shown in FIG. 1, on the door 12. The engagement of the ridge with the insert 42 defines a hinge line about which the tab 34 is pivotable. Tension applied to the flap 30 from the load of objects supported within the closed interior 26 are transmitted through the flap toward the hinge line. Beyond the hinge line tension forces are transmitted substantially across the front portion 30a of tab 34. When a threshold supported load is reached, sufficient torque is thereby applied to the tab 34 to rotate it upwardly about the hinge line until the tab engages a second surface, such as the window 40, within the vehicle door thereby wedging it within the door and so securing the entire container 10 to the vehicle. The frictional engagement between the flap 30 and rubber insert 42 is sufficient to resist dislodging of the container 10 when the vehicle door window 40 is raised or lowered.

To remove the container 10 and its contents, the container is merely lifted thereby relieving the tension forces applied to the flap and so eliminating the net torque pinning the tab to the second surface. The flap can then be slid downwardly a distance sufficient to release the engagement of the tab with the insert 42, tilted within the door and then withdrawn upwardly from the slot 38 with the hinge line at a sufficient angle from horizontal to avoid reengagement of the ridge with the insert. Once removed the container can be discarded or the contents easily emptied and the container reinstalled.

Figure 5:
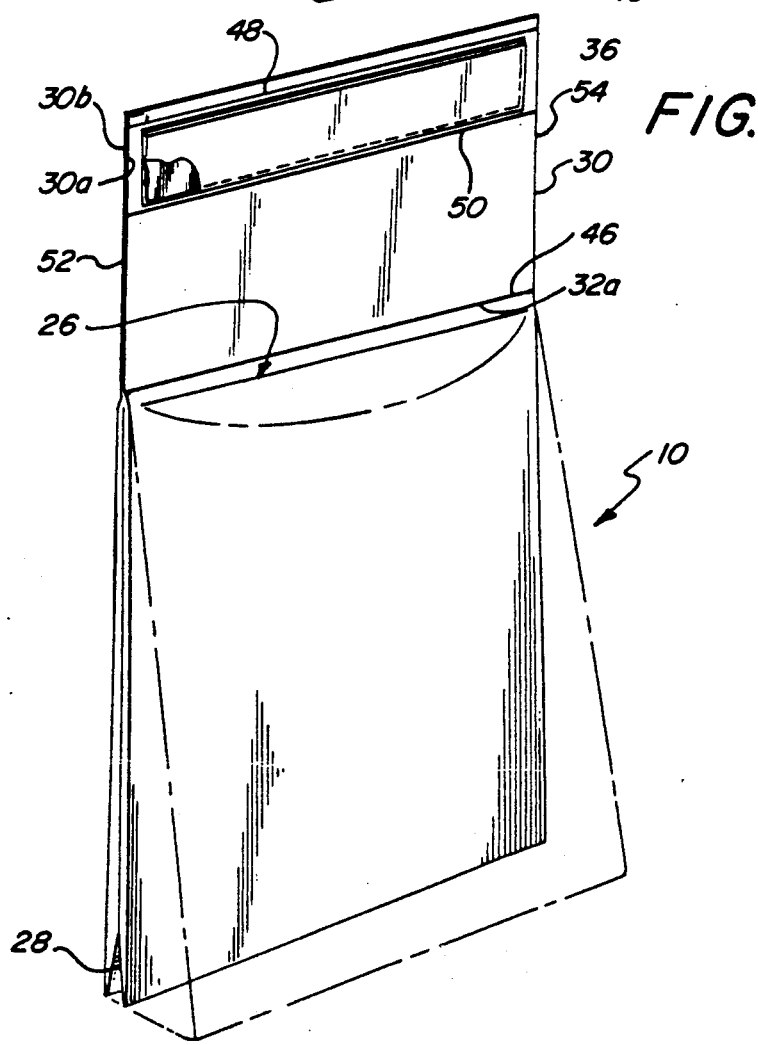
FIG. 5 is a perspective view of another embodiment of the container of the present invention.

Another embodiment of the container is shown in FIG. 5 wherein the outer edge 32a of the flap 30 is folded over the front and heat sealed along a laterally extending line 46 to the rear panel 20 adjacent the opening 26. The stiff section 36 is sandwiched between the front and rear portions 30a and 30b of the flap 30 as in the embodiment of FIGS. 1-3. However, in the embodiment of FIG. 5 the front and rear portions 30a and 30b of the flap 30 are further heat sealed along laterally extending lines 48 and 50. The front and rear sections of the flap 30 are also heat sealed along their edges 52 and 54. This arrangement increases the strength of the flap 30.

The terms and expressions which have been employed in the foregoing specification are used herein as terms of description and not limitation, and there is no intention, in the use of such terms and expressions, of excluding equivalents of the features shown and described or portions thereof, it being recognized that the scope of the invention is defined and limited only by the claims which follow.

What is claimed is:

1. A receptacle for the retention of unsecured objects comprising:
   a vehicle door having a substantially horizontal slot formed therein for receiving a retractable window;
   said vehicle door including a rubber insert mounted proximate said slot between said door and said window;
   a container fabricated of a flexible sheet material and having a partially closed interior for retaining objects placed therein;
   said container including an integrally formed flap for suspending said container and objects placed therein from said door for convenient access by a vehicle occupant to said partially closed interior, the flap having a horizontally disposed tab adjacent an outer edge thereof remote from the interior of the container; and
   said tab being a strip of rigid material of a substantially uniform thickness secured to said flap for removable insertion in said slot, the strip of rigid material having an inner edge spaced from said outer edge of the flap forming a horizontal hinge line when inserted into said slot for engaging the rubber insert to prevent the container from being dislodged from the door when the window is raised or lowered.

2. The invention of claim 1 wherein the objects in said container provide a torque producing tension to said outer edge of said flap.

3. The invention of claim 1 wherein said flap includes an outer segment folded over for sealing engagement with said strip of rigid material sandwiched therebetween.

4. The invention of claim 3 wherein said rigid material is chipboard.

5. The invention of claim 1 wherein said container is fabricated of flexible plastic.

6. The invention of claim 1 wherein said container is fabricated of paper.

7. The invention of claim 1 wherein the rigid material has a thickness of about 10 millimeters.

8. A disposable storage receptacle for holding litter within a vehicle having a interior, the vehicle including a door having a horizontal slot formed therein for receiving a retractable window and a rubber insert mounted adjacent the slot on the inside of the vehicle for engaging the window, the receptacle comprising:
   a container fabricated of thin flexible plastic sheet material having a partially closed interior with an opening for retaining litter therein;
   the container including an integrally formed flap extending above the opening therein for suspending the container and litter placed therein from the inside portion of the vehicle door for convenient access by a vehicle occupant, said flap having an outer edge spaced from said container; and
   a rectangular tab of increased rigidity and substantially uniform thickness secured to said flap, said tab having an inner edge spaced from said outer edge of the flap forming a horizontal hinge line disposed above the opening when said flap is inserted into the door slot so that the hinge line engages the rubber insert to provide a frictional force between the rubber insert and the tab which is greater than a frictional force between the window and the tab when the window is raised or lowered to prevent the container from being dislodged.

9. The invention of claim 8 wherein the tab includes a strip of rigid material.

10. The invention of claim 9 wherein the flap includes an outer segment folded over for sealing engagement with the strip of rigid material sandwiched therebetween.

11. The invention of claim 9 wherein the tab is about 1 inch in height.

12. The invention of claim 11 wherein the tab is about 10 millimeters in thickness.

* * * * *